United States Patent [19]
Mekanik

[11] Patent Number: 5,760,495
[45] Date of Patent: Jun. 2, 1998

[54] INVERTER/CHARGER CIRCUIT FOR UNINTERRUPTIBLE POWER SUPPLIES

[75] Inventor: Fereydoun Mekanik, Bellingham, Wash.

[73] Assignee: Alpha Technologies, Inc., Bellingham, Wash.

[21] Appl. No.: 693,495

[22] Filed: Aug. 2, 1996

Related U.S. Application Data

[63] Continuation of Ser. No. 394,641, Feb. 22, 1995, abandoned.

[51] Int. Cl.$^6$ ........................................ H02J 7/00
[52] U.S. Cl. ........................ 307/66; 307/64; 363/132; 363/136
[58] Field of Search ................... 307/64, 66; 363/132, 363/136

[56] References Cited

U.S. PATENT DOCUMENTS

| | | |
|---|---|---|
| 1,718,238 | 6/1929 | Kettering et al. . |
| 2,007,415 | 7/1935 | Walker . |
| 2,014,101 | 9/1935 | Bryan . |
| 2,037,183 | 4/1936 | Strieby . |
| 2,063,994 | 12/1936 | Frank et al. . |
| 2,085,072 | 6/1937 | Bobe . |
| 2,165,969 | 7/1939 | Humbert et al. . |
| 2,240,123 | 4/1941 | Shoup et al. . |
| 2,302,192 | 11/1942 | Dannheiser . |
| 2,427,678 | 9/1947 | Laging . |
| 2,688,704 | 9/1954 | Christenson . |
| 2,856,543 | 10/1958 | Dixon et al. . |
| 2,920,211 | 1/1960 | Gotoh . |
| 3,064,195 | 11/1962 | Freen . |
| 3,221,172 | 11/1965 | Rolison . |
| 3,283,165 | 11/1966 | Bloch . |
| 3,293,445 | 12/1966 | Levy . |
| 3,305,762 | 2/1967 | Geib, Jr. . |
| 3,339,080 | 8/1967 | Howald . |
| 3,345,517 | 10/1967 | Smith . |
| 3,348,060 | 10/1967 | Jamieson . |
| 3,435,358 | 3/1969 | Rheinfelder . |
| 3,458,710 | 7/1969 | Dodge . |
| 3,525,035 | 8/1970 | Kakalec . |
| 3,525,078 | 8/1970 | Baggott . |
| 3,636,368 | 1/1972 | Sia . |
| 3,678,284 | 7/1972 | Peters . |
| 3,691,393 | 9/1972 | Papachristou . |
| 3,859,589 | 1/1975 | Rush . |
| 3,943,447 | 3/1976 | Shomo, III . |
| 4,170,761 | 10/1979 | Koppehele . |
| 4,460,834 | 7/1984 | Gottfried . |
| 4,475,047 | 10/1984 | Ebert, Jr. ........................... 307/66 |
| 4,686,375 | 8/1987 | Gottfried . |
| 4,719,550 | 1/1988 | Powell et al. ........................ 363/37 |
| 4,745,299 | 5/1988 | Eng et al. . |
| 4,748,341 | 5/1988 | Gupta . |
| 4,748,342 | 5/1988 | Dijkmans . |
| 4,763,014 | 8/1988 | Model et al. . |
| 5,010,469 | 4/1991 | Bobry . |
| 5,057,698 | 10/1991 | Widener et al. . |
| 5,172,009 | 12/1992 | Mohan . |
| 5,185,536 | 2/1993 | Johnson, Jr. et al. . |
| 5,198,698 | 3/1993 | Paul et al. ......................... 307/64 |
| 5,198,970 | 3/1993 | Kawabata et al. . |
| 5,237,208 | 8/1993 | Tominaga et al. .................. 307/66 |
| 5,302,858 | 4/1994 | Folts ................................. 307/66 |

FOREIGN PATENT DOCUMENTS 2005118  4/1979  United Kingdom .

*Primary Examiner*—William M. Shoop, Jr.
*Assistant Examiner*—Kim Lockett
*Attorney, Agent, or Firm*—Michael R. Schacht; Hughes, Multer & Schacht, P.S.

[57] ABSTRACT

A power supply for generating an uninterruptible AC power signal. The power supply utilizes leakage inductance in its transformer to eliminate the need for an output inductor. In standby mode, the AC power signal is generated from a battery by a switching circuit. Certain components of the switching circuit are also used to charge the battery when the power supply is operating in line mode.

29 Claims, 15 Drawing Sheets

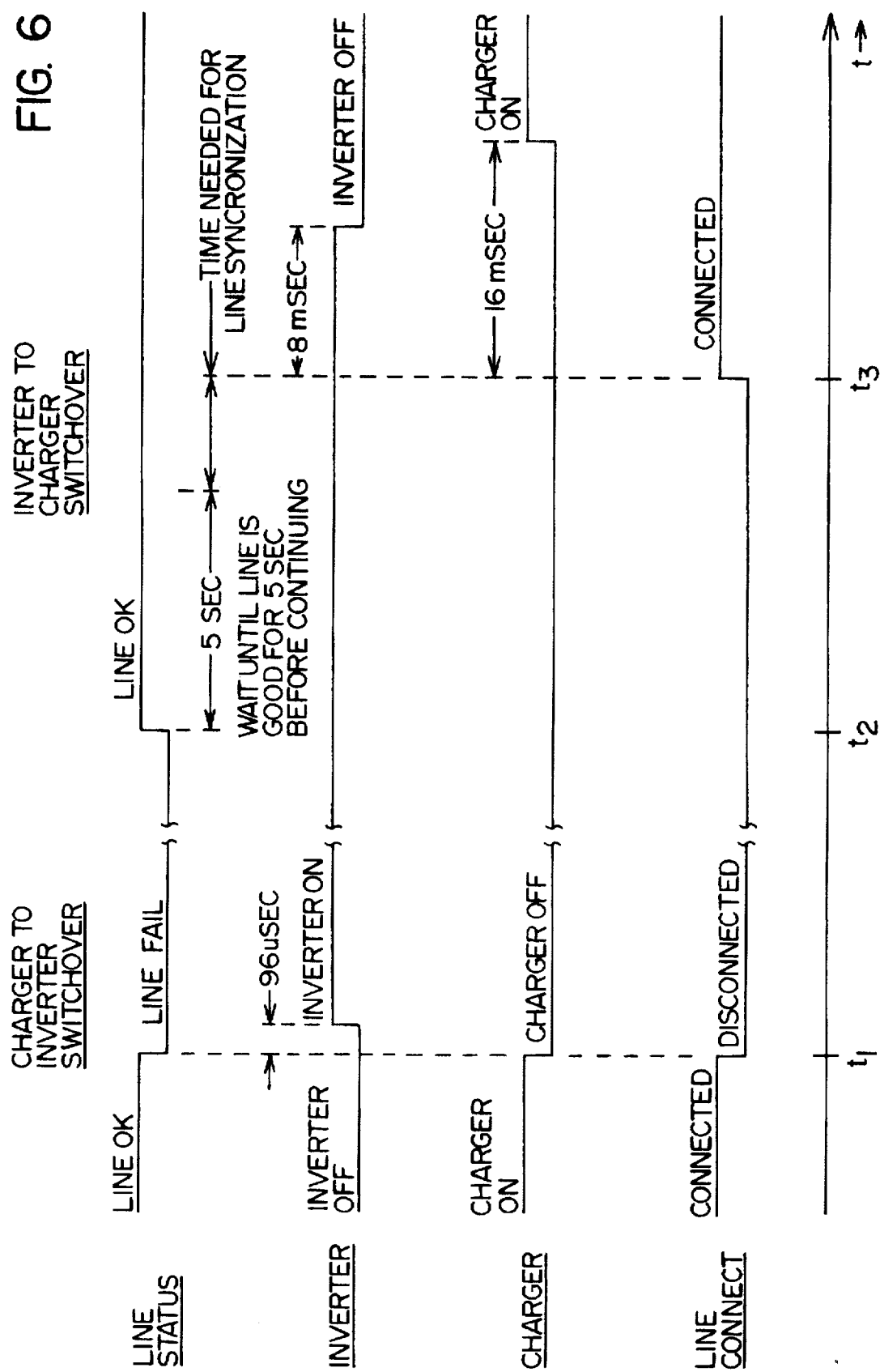

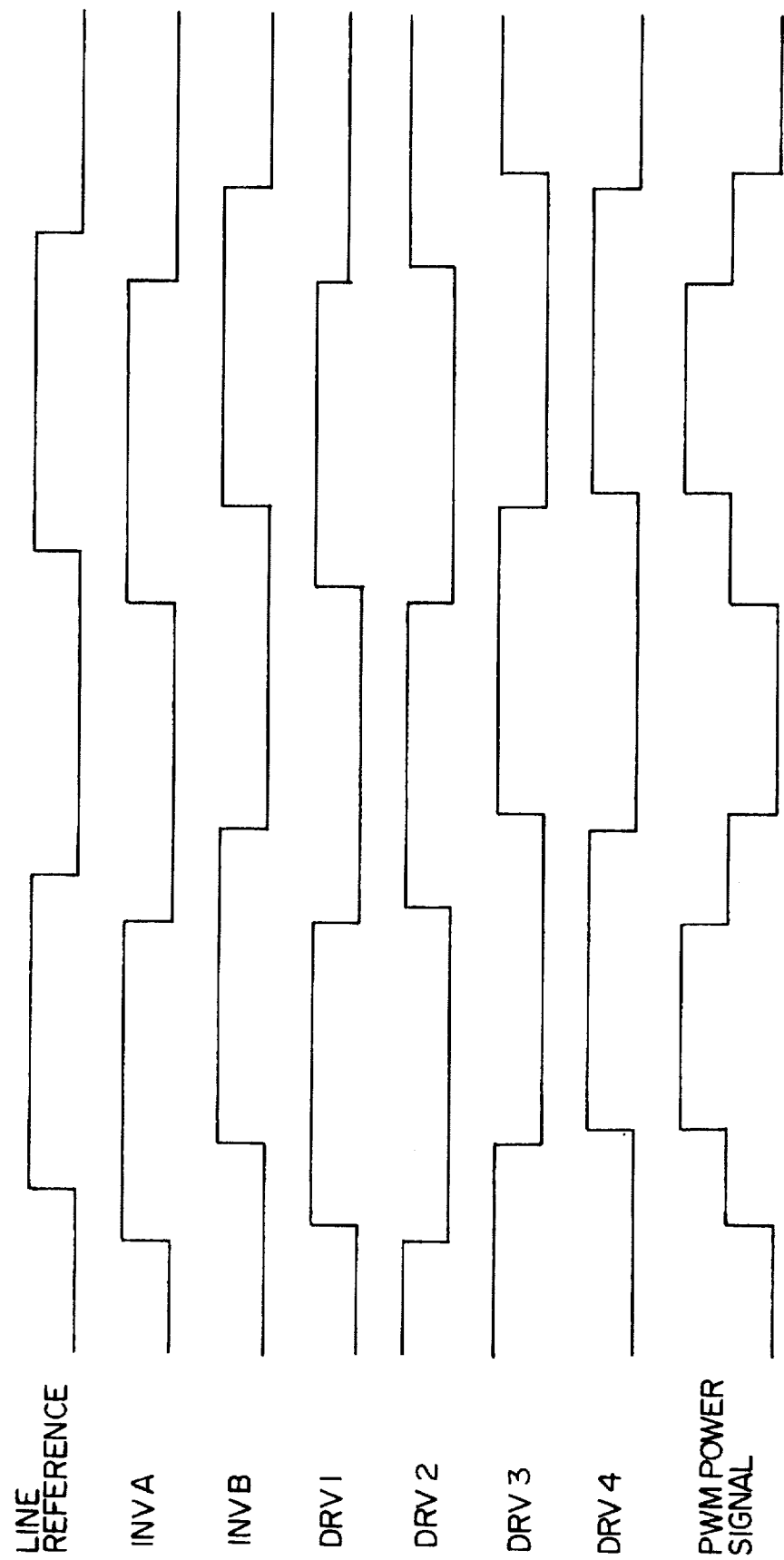

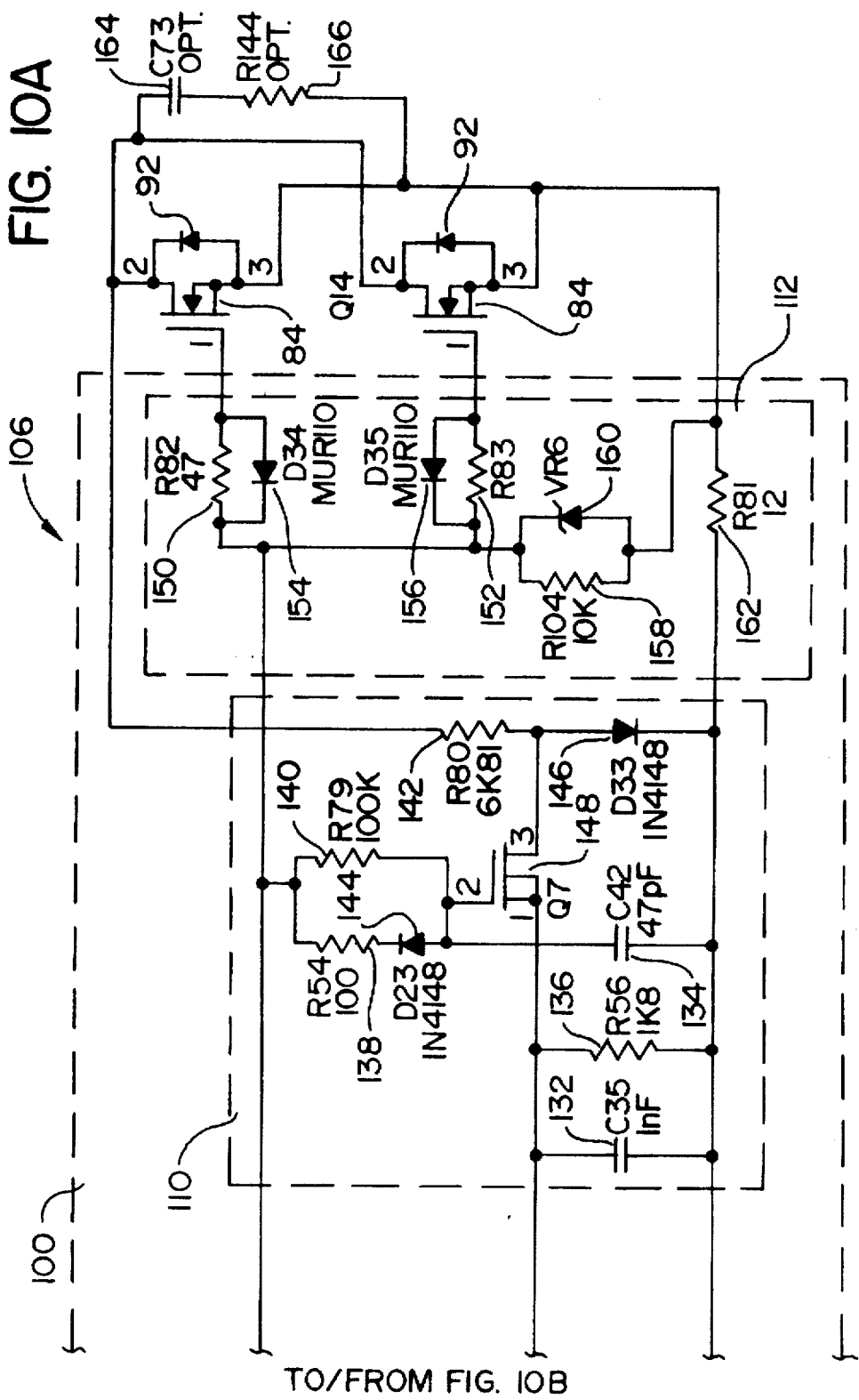

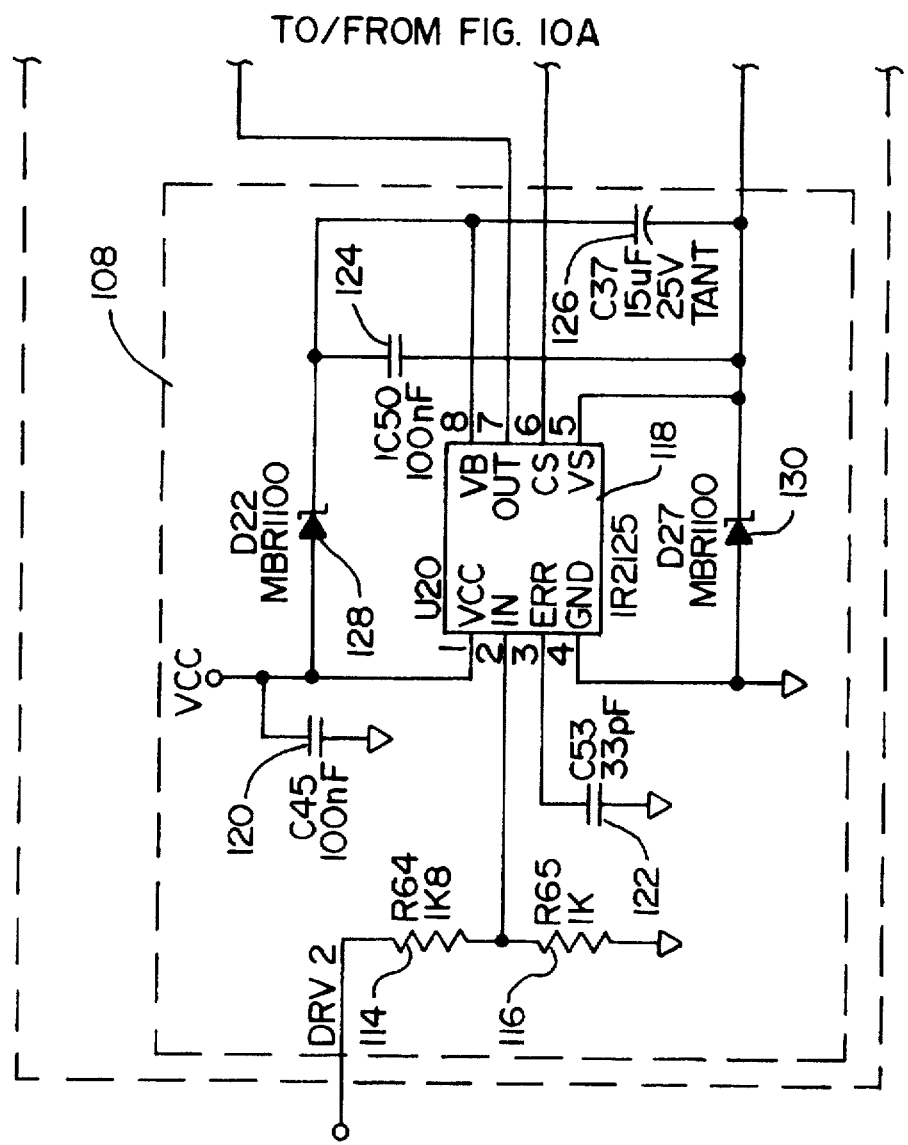

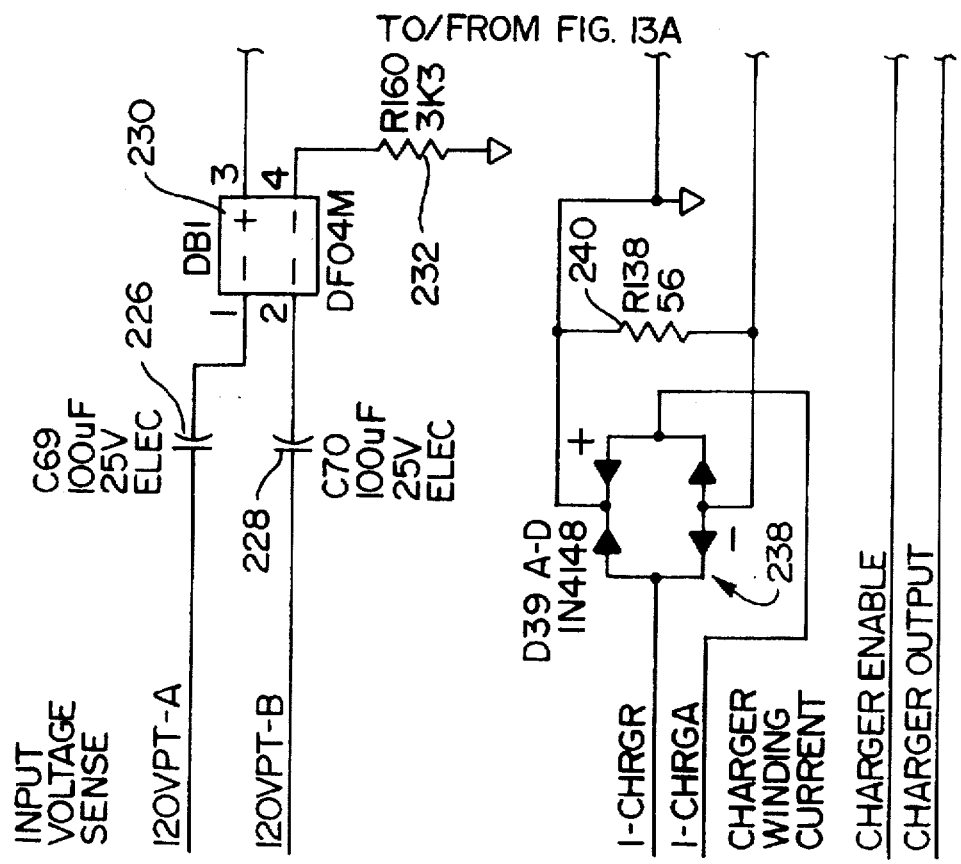

INVERTER/CHARGER CIRCUIT FOR UNINTERRUPTIBLE POWER SUPPLIES

This application is a continuation of application Ser. No. 08/394,641 filed Feb. 22, 1995, now abandoned.

TECHNICAL FIELD

The present invention relates to uninterruptible power supplies and, more particularly, uninterruptible power supplies having switch mode converters.

BACKGROUND OF THE INVENTION

The present invention is of particular importance when employed in the context of an uninterruptible power supply (UPS) for a cable TV system, and that application will be discussed in detail herein. The present invention has broader application to other environments, however. For example, coaxial cable networks are being used or contemplated for use as communications systems that allow signals to be broadcast from the home as well as to the home. The scope of the present invention should thus be determined in accordance with the claims appended hereto and not the following detailed description.

In many environments, it is highly desirable that power be maintained to electrical equipment even if utility power is disrupted. One such environment is a cable TV (CATV) signal distribution system. In a CATV system, power must be maintained to line extending amplifiers dispersed throughout the system to allow the signal to be propagated throughout the system.

Accordingly, UPSs are distributed throughout the CATV system to provide an AC power signal for powering the line extending amplifiers even if utility power is lost. In line mode, the UPS generates an AC power signal from the utility line voltage and charges the battery. In converter mode, the UPS generates the AC power signal from a battery within the UPS.

Such prior art UPSs comprise a switch mode converter and a separate switch mode rectifier configured as a charger. In converter mode, the switch mode converter generates an AC power signal from the DC voltage across the battery. In line mode, the switch mode rectifier generates a signal for charging the battery.

PRIOR ART

The patents discussed below were uncovered as part of a professional patentability search conducted on behalf of the applicant. None of these patents disclose a power supply that solves the problems solved by the present invention.

U.S. Pat. No. 5,185,536 (Johnson, Jr.) discloses the use of the primary winding of a transformer as part of the inductance in an output circuit of a UPS.

U.S. Pat. No. 5,172,009 (Mohan) discloses a UPS having an inverter using an H-bridge topology.

U.S. Pat. No. 5,302,858 (Folts) discloses a battery charger using an H-bridge topology.

U.S. Pat. No. 5,010,469 (Bobry) discloses an inverter for use in a UPS that operates at high voltage in line mode and low voltage in battery mode.

U.S. Pat. No. 4,748,342 (Dijkmans) discloses a power supply circuit that generates two DC voltages from a single AC source.

U.S. Pat. No. 4,748,341 (Gupta) discloses a UPS employing a transformer having a plurality of taps connected to the supply voltage. Each tap has an associated switch to allow selection of a given tap as appropriate to maintain the output voltage within a predetermined range.

U.S. Pat. No. 4,745,299 (Eng et al.) discloses a UPS in which the line voltage is rectified to obtain a DC signal. This DC signal and a secondary DC signal generated by a battery are switched by the same control circuit.

U.S. Pat. No. 4,719,550 (Powell et al.) discloses a UPS in which AC power signals from a number of sources are combined at a node from which an output voltage is derived. When a power source generates an AC signal, the AC signal is rectified into a DC signal and then converted back into an AC signal. When the power source generates a DC signal, the DC signal is simply converted into an AC signal and applied to the common node.

U.S. Pat. No. 3,348,060 (Jamieson) discloses a UPS having an inverter adapted to permit flow of current in both directions. The phases of a waveform generated by the inverter and a source waveform are shifted to maintain a battery at a predetermined condition of charge.

U.S. Pat. No. 3,339,080 (Howald) discloses a converter circuit that charges a battery when the circuit is connected to an AC source voltage and to generate an AC signal for supplying power to a load when not connected to the source signal.

U.S. Pat. No. 3,293,445 (Levy) discloses a power supply circuit in which the battery is arranged in series with an AC power source. The battery is charged by the AC source when present and supplies power to the load when the AC power source is not present.

U.S. Pat. No. 4,763,014 (Model et al.) discloses a switch that is controlled to prevent reverse power flow.

U.S. Pat. No. 5,057,698 (Widener et al.) discloses a power supply having a current shunt that reduces output current to zero as the operating frequency of the converter moves to a predetermined frequency.

U.S. Pat. No. 5,198,970 (Kawabata et al.) discloses a UPS having an inverter using an H-bridge topology.

OBJECTS OF THE INVENTION

From the foregoing, it should be clear that a primary object of the present invention is to provide improved uninterruptible power supplies.

Another more specific object of the present invention is to provide a UPS having a favorable combination of the following characteristics:

(a) may be used in a coaxial cable network for transmitting CATV and communications signals;

(b) reduce the number and cost of parts necessary to implement a UPS circuit;

(c) reduce the cost of the transformer used by the UPS circuit;

(d) allow certain relatively expensive parts to be used both by the inverter portion of the UPS and the charger portion of the UPS;

(e) implement power factor correction while charging the battery of the UPS.

Other objects of the present invention will become apparent from the following detailed description and claims.

SUMMARY OF THE INVENTION

These and other objects are achieved by the present invention, which is an uninterruptible power supply system basically comprising a transformer, a switch circuit, a charger control circuit, an converter control circuit, a control logic circuit, and a battery. The transformer comprises inductively coupled first and second primary windings and a secondary winding isolated from the first and second windings by a magnetic shunt. AC line voltage is connected to the first primary winding, while the switch circuit is connected to the second primary winding. The secondary winding is connected to output terminals.

In line mode, the switch circuit operates under the control of the charger control circuit to charge the battery. In inverter mode, the switch circuit operates under the control of the inverter control circuit to generate a signal from which the AC power signal may be generated. The control logic circuit controls which of the charger control circuit and the inverter control circuit controls the switch circuit.

With the UPS system configuration just described, certain switches in the switch circuit may be used both during charger mode and during inverter mode. Further, the second primary winding is also used both during inverter mode and charger mode. Because the UPS circuit uses one winding and certain switches in both inverter and charger modes, a significant reduction in the parts necessary to implement the UPS function is achieved.

Further, the transformer configuration employed eliminates the need for a pair of inductors used by prior art UPSs when they are operating in charger mode. These inductors are relatively expensive, and the elimination thereof results in a significant reduction in the overall cost of the UPS circuit.

Additionally, the cost of the transformer when configured as described above can be minimized because each of the three windings comprises a single bobbin formed of only one gauge of wire. The three bobbins employed to create the transformer of the present invention are thus easily and inexpensively manufactured without the need to change the gauge of the wire during fabrication of the windings.

The control logic circuit is configured to allow the switches in the switch circuit to be controlled by the inverter control circuit when the UPS is in inverter mode and the charger control circuit when the UPS is in line/charger mode. The charger control circuit controls the switches in the switch circuit in a manner that creates a DC voltage for charging the battery from the utility line voltage with power factor correction.

BRIEF DESCRIPTION OF THE DRAWINGS

FIG. 6 is a timing diagram depicting an exemplary switch-over from line/charger mode to inverter mode and back to line/charger mode;

FIG. 7 is a timing diagram depicting the wave forms employed to generate the inverter drive signal;

FIG. 10 shows the detail of construction and operation of the drive circuits shown in FIGS. 8 and 9;

DETAILED DESCRIPTION

Figure 1:
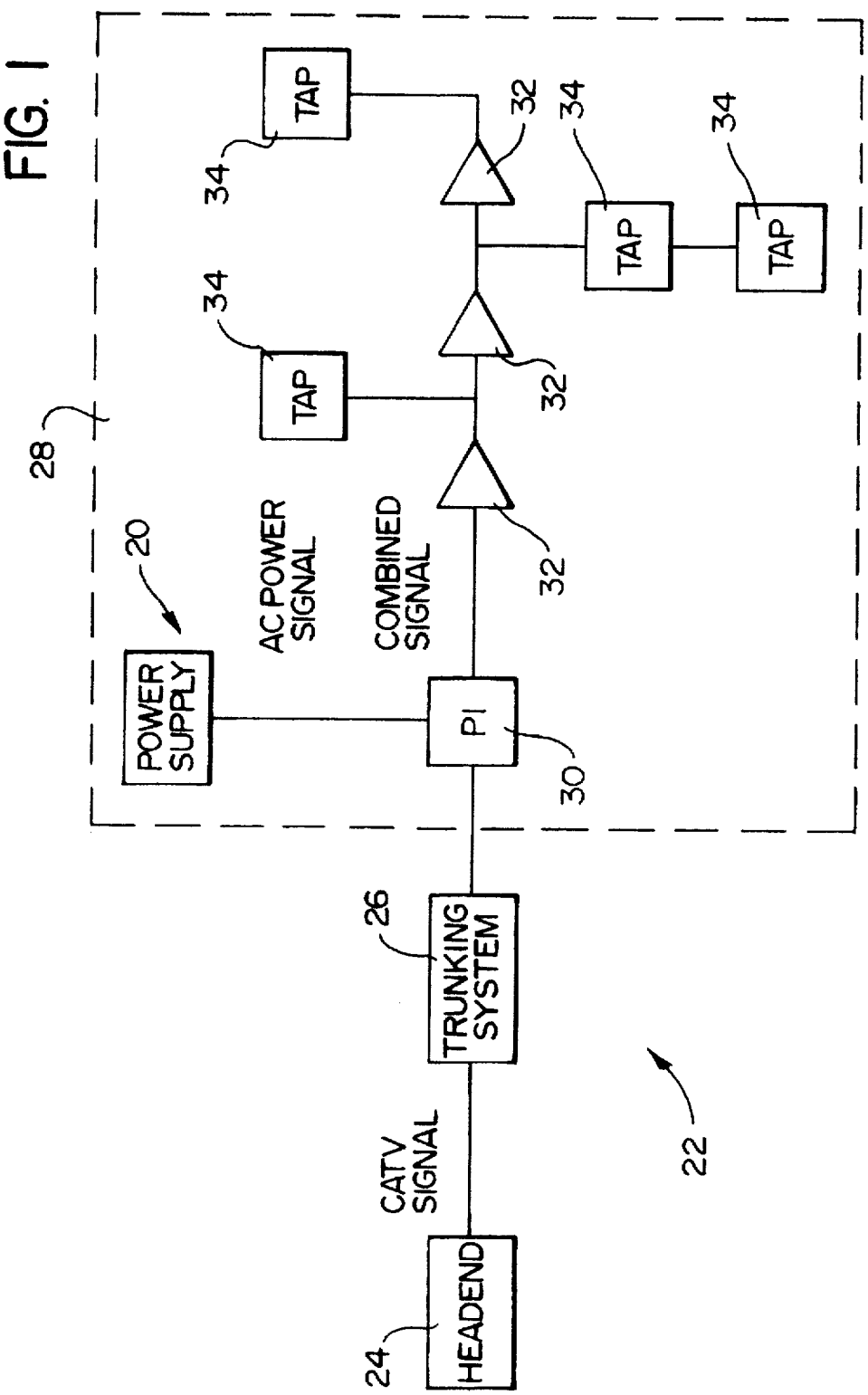
FIG. 1 is a block diagram depicting an exemplary environment in which a UPS constructed in accordance with, and embodying, the principles of the present invention may be employed.

Referring initially to FIG. 1 of the drawing, depicted therein is an exemplary power supply circuit 20 constructed in accordance with, and embodying, the principles of the present invention. In FIG. 1, the power supply circuit 20 is shown in the context of a CATV system 22.

In addition to the power supply 20, the CATV system 22 comprises a head end 24, a trunking system 26, a power inserter 28, a plurality of line extending amplifiers 30, and a plurality of taps 32. The power supply 20, power inserter 28, line extending amplifiers 30, and taps 32 form a local distribution portion 34 of the CATV system 22.

The head end 24 generates a CATV signal from a variety of sources. The trunking system 26 carries the CATV signal to the local distribution portion 34.

Within the local distribution 34, the power supply 20 generates an AC power signal. The power inserter 28 combines the AC power signal and the CATV signal to obtain a combined signal. The line extending amplifiers 30 amplify the CATV signal portion of the combined signal using power obtained from the AC power signal portion thereof. The taps 32 are arranged to pass only the CATV signal to one or more subscriber residences (not shown) physically located near the taps.

While not shown in the exemplary CATV system 22, it should be understood that a plurality of power supplies such as the power supply 20 may be arranged throughout the local distribution portion 34. The exact location of these power supplies is based on factors such as the availability of utility line voltage, signal strength, and the distance between the subscribers residences within the local distribution area.

Figure 2:
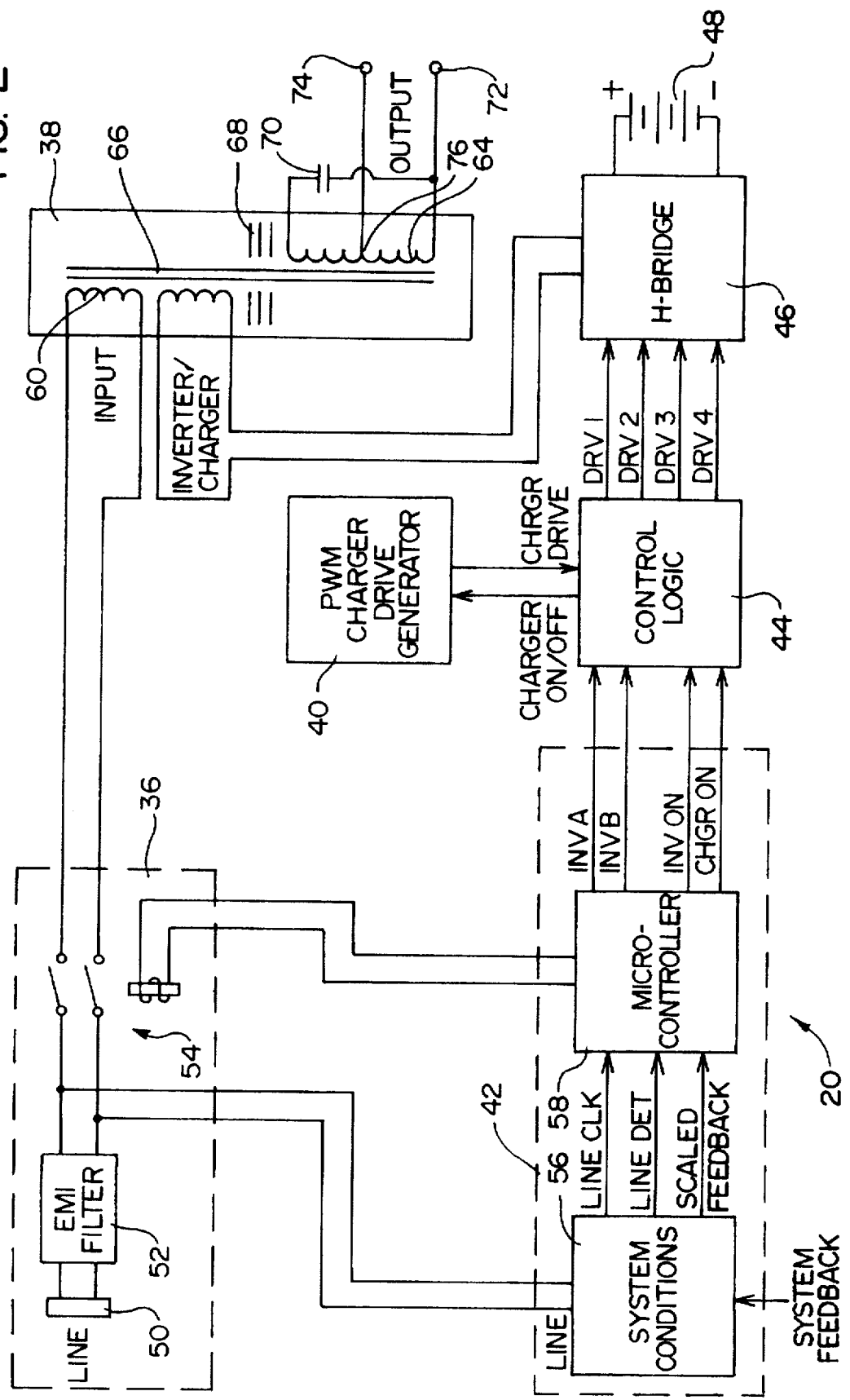
FIG. 2 is a block diagram depicting a UPS circuit constructed in accordance with, and embodying, the principles of the present invention.

Referring now to FIG. 2, the UPS circuit 20 will be described in further detail. This circuit 20 basically comprises a utility connect circuit 36, a transformer 38, a charger control circuit 40, a system control circuit 42, a control logic circuit 44, a switch circuit 46, and a battery 48.

The utility connect circuit 36 comprises a line terminal 50 adapted to connect to the utility connection, an EMI filter 52, and a disconnect relay 54. These components 50, 52, and 54 are conventional. As will be described further below, the disconnect relay 54 is closed when the UPS circuit 20 is in a line/charger mode and open when the UPS circuit 20 is in a inverter mode.

The system control circuit 42 comprises a condition detect circuit 56 and a microcontroller 58. The condition detect circuit 56 samples the utility line voltage and generates a LINE CLK signal and a LINE DET signal. The LINE CLK signal indicates the frequency and phase of the utility line voltage, while the LINE DET signal is high when the utility line voltage is present and low when the utility line voltage is not present or out of certain predetermined limits. The condition detect circuit 56 also generates a SCALED FEEDBACK signal based on a SYSTEM FEEDBACK signal that is an analog of the output signal. The condition detect circuit 56 is basically conventional and will not be described herein in further detail.

The microcontroller 58 monitors the LINE DET signal and, based on this signal, determines whether the UPS circuit 20 should be in line/charger mode or in inverter mode. The microcontroller 58 energizes and thus closes the disconnect relay 54 when the UPS circuit 20 is in the line/charge mode and deenergizes the disconnect relay 54 when the UPS circuit 20 is in the inverter mode.

The microcontroller 58 further generates an INV ON signal and a CHGR ON signal. In particular, the INV ON signal is high when the UPS circuit 20 is in the inverter mode and low when it is in the line/charge mode. The CHGR ON signal, on the other hand, is high when the UPS circuit 20 is in the line/charge mode and low when it is in the inverter mode.

Additionally, the microcontroller 58 generates INV A and INV B signals for controlling the switch circuit 46 when the UPS circuit 20 is in inverter mode. In response to a CHARGER ON/OFF signal generated by the control logic circuit 44, the charger control circuit 40 generates a CHARGER DRIVE signal.

Under the control of the INV ON and CHGR ON signals, the control logic circuit 44 passes either the INV A and INV B signals generated by the microcontroller 58 or the CHARGER DRIVE signal generated by the charger control circuit 40 as the DRV1, DRV2, DRV3, and DRV4 signals.

As will be described in detail below, the switch circuit 46 comprises four switching devices arranged in a H-bridge configuration. The DRV1, DRV2, DRV3, and DRV4 control the switching devices in the switch circuit 46. Under the control of these signals, the switch circuit 46 either develops a signal appropriate for charging the battery 48 when the UPS circuit 20 is in line/charge mode or develops a pulse width modulated power signal from which a stand-by AC power signal may be generated.

Figure 5A:
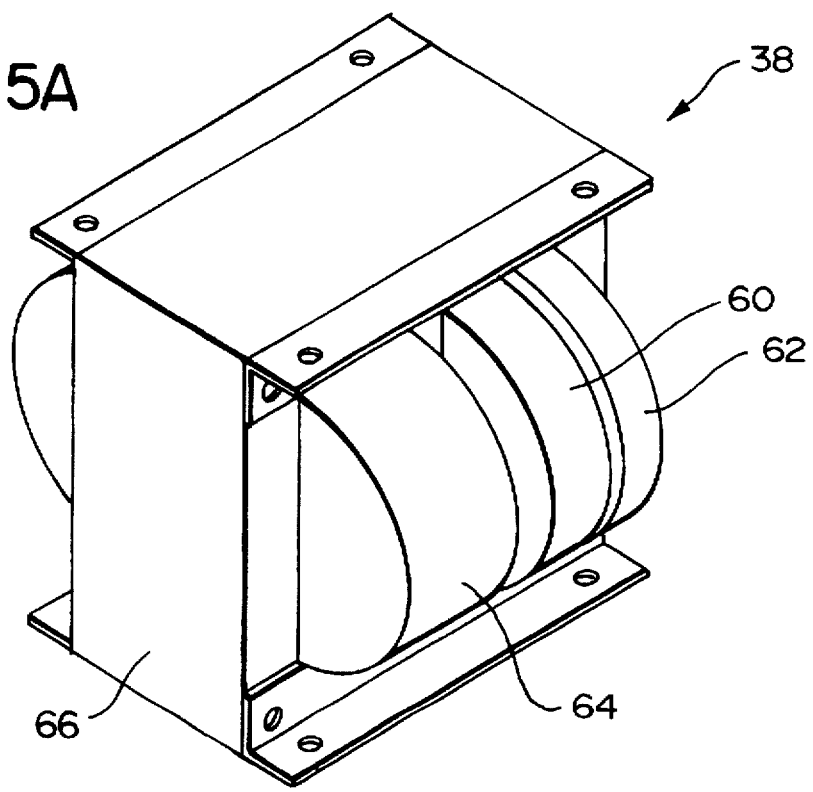
FIG. 5A is an isometric view depicting a transformer constructed in accordance with, and embodying, the principles of the present invention.
Figure 5B:
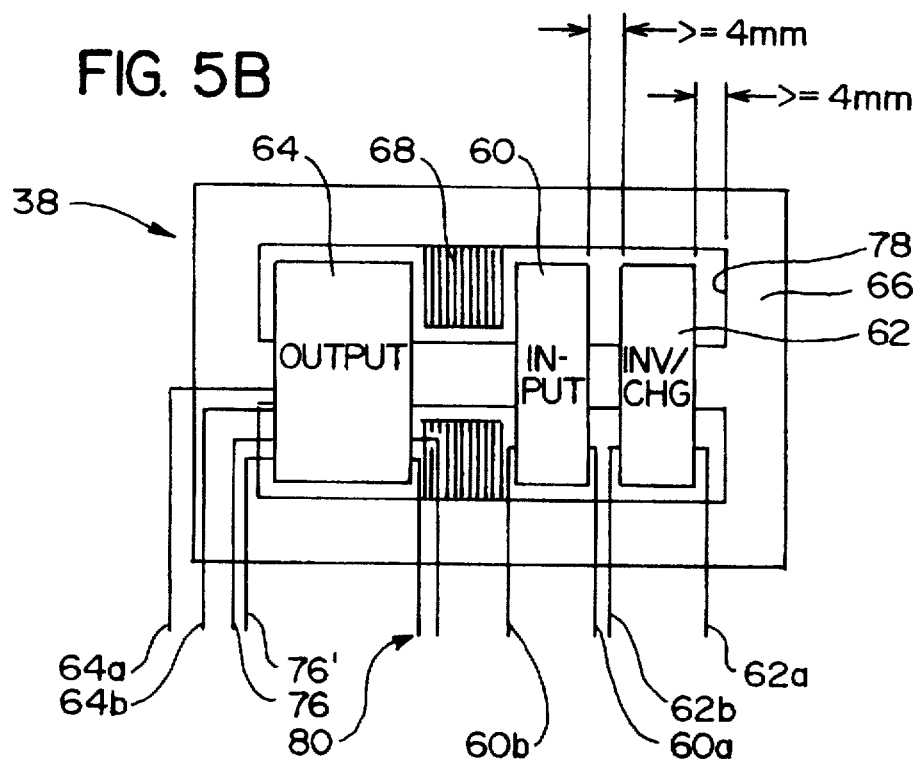
FIG. 5B is a somewhat schematic view depicting in more detail the construction of the transformer shown in FIG. 5A.

Referring now to FIGS. 2, 5A, and 5B, it can be seen that the transformer 38 basically comprises first primary windings 60, second primary windings 62, and secondary windings 64. The primary windings 60 and 62 are arranged on a magnetic core 66. A magnetic shunt 68 is arranged between the secondary windings 64 and the primary windings 60 and 62.

The first primary winding 60 comprises first and second terminals 60a and 60b that are electrically connected to utility power through the utility connect circuit 36. The second primary windings 62 comprises first and second terminals 62a and 62b that are electrically connected to the switch circuit 46 as will be described below in further detail. The secondary windings 64 comprise first and second terminals 64a and 64b and a center tap 70. A ferroresonant capacitor 72 is electrically connected across the first and second terminals 64a and 64b. First and second output terminals 72 and 74 are electrically connected between the center tap 70 and second terminal 64b of the secondary winding 64, respectively.

With the arrangement just described, the transformer 38 operates as a ferroresonant transformer, although the input windings 60 and inverter/charger windings 62 have a linear relationship. In a basic form, however, the present invention may also be used in a power supply employing a linear transformer.

In the exemplary transformer 38, an AC power signal across either of the first primary winding 60 will result in a linearly related AC signal across the second primary windings 62. An AC signal across either of the primary windings 60 and 62 results in a non-linearly related AC power signal across the secondary windings 64.

In line/charger mode, AC line voltage is applied to the first primary winding 60, resulting in an AC power signal across the output terminals 72 and 74. The output terminals 72 and 74 are connected to the power inserter 30 shown in FIG. 1 such that the AC power signal thereacross may be used by the line-extending amplifiers 32 as described above. Additionally, the line voltage across the first primary winding 60 results in an AC voltage across the second primary winding 62 that is provided to the switch circuit 46 to charge the battery 48.

When the UPS circuit 20 is in its inverter mode, the inverter power signal generated by the switch circuit 46 and battery 48 is present across the second primary windings 62. This results in an AC power signal being generated across the output terminals 72 and 74.

Figure 3:
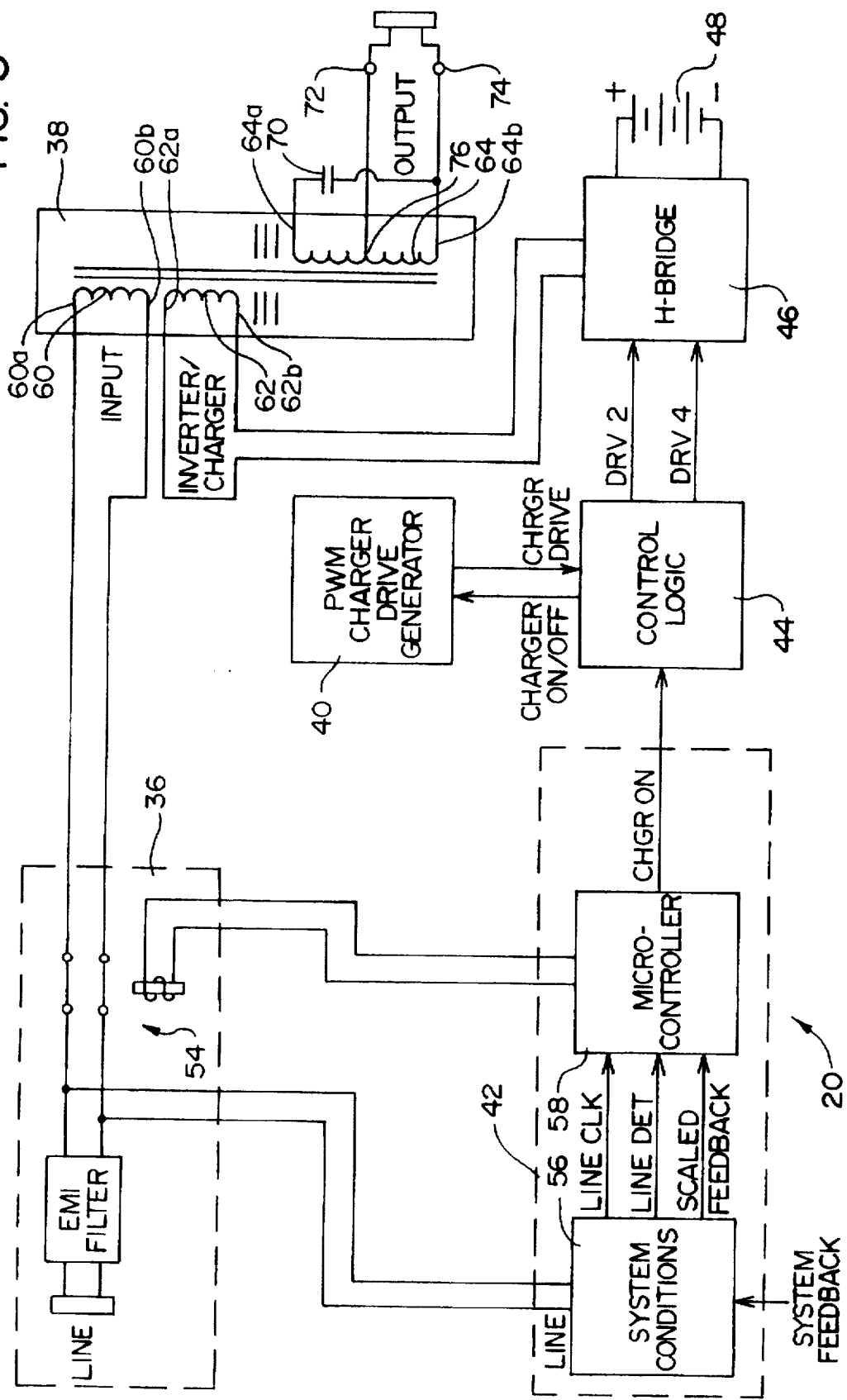
FIG. 3 is a block diagram showing the effective circuit obtained when the UPS circuit described in FIG. 2 is placed in line/charger mode.
Figure 4:
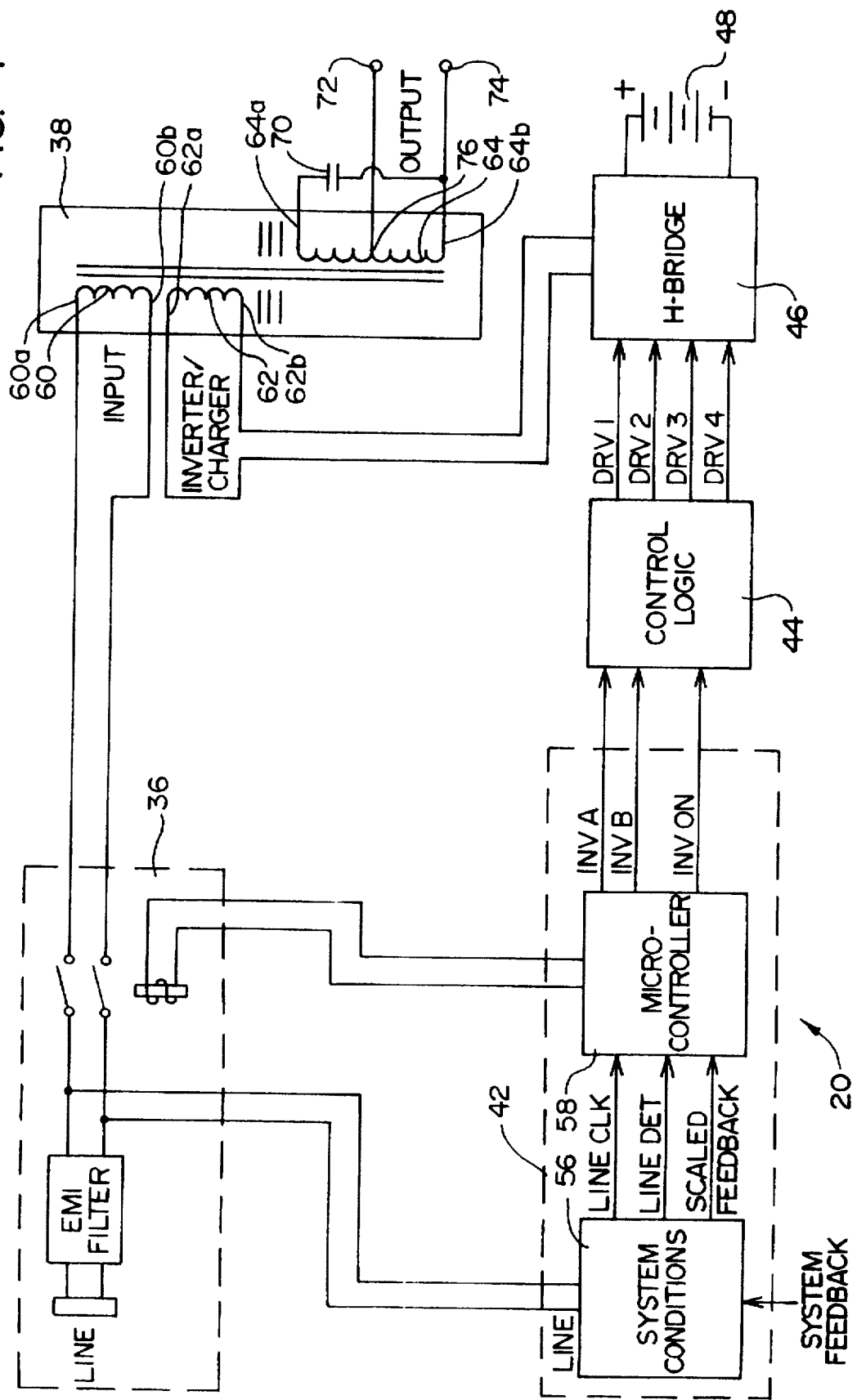
FIG. 4 is a block diagram showing the equivalent circuit obtained when the UPS circuit depicted in FIG. 2 is placed in inverter mode.

Referring now to FIGS. 3 and 4, the effective circuits obtained when the UPS circuit 20 is placed in line/charger mode and inverter mode will be explained. In particular, FIG. 3 shows the effective circuit obtained when the UPS circuit 20 is placed in line/charger mode. In line/charger mode, the microcontroller generates the CHRG ON signal to direct the control logic circuit 44 to generate the charger ON/OFF signal and pass the charger drive signal as the DRV2 and DRV4 signals. The switch circuit 46, under the control of the DRV2 and DRV4 signals, charges the battery 48.

The microcontroller 58 further energizes the disconnect relay 54 to pass the line voltage through to the input windings 60 of the transformer 38.

Referring now to FIG. 4, depicted therein is the UPS circuit 20 in inverter mode. In inverter mode, the microcontroller 58 deenergizes the disconnect relay 54 to prevent line voltage from reaching the input windings 60 and prevent power from being fed back to the utility power grid.

At the same time, the microcontroller 58 generates an INV ON signal that instructs the control logic circuit 44 to pass the INV A and INV B signals as the DRV1, DRV2, DRV3, and DRV4 signals. These signals, in turn, control the switch circuit 46 to develop the inverter power signal described above from the DC voltage present across the battery 48. As described above, the transformer configuration thus results in an AC power signal being present across the output terminals 72 and 74 having the same frequency as the inverter power signal.

Referring again to FIGS. 5A and 5B, the transformer 38 will be described in further detail. These figures show that the input windings 60 and the inverter/charger windings 62 are spaced from each other a distance greater than or equal to four millimeters. The inverter/charger windings 62 are further spaced from an end wall 78 of the core 66 a distance greater than or equal to four millimeters.

This physical configuration allows leakage inductance between the primary winding 60 and 62 and obviates the need for separate inductors for the switch mode rectifier during line/charger mode.

Additionally, FIG. 5B shows that the magnetic shunt 68 is arranged between the input windings 60 and the output windings 64. As is well-known in the art, the magnetic shunt 68 establishes a magnetic path when the ferroresonant transformer is saturated.

FIG. 5B also shows that an alternative center tap 76' may be provided to allow the UPS circuit 20 to operate in environments using AC power signals of different amplitudes.

Indicated at 80 in FIG. 5B are taps from which the SYSTEM FEEDBACK signal discussed above may be obtained.

Referring now to FIG. 6, depicted therein is a timing diagram showing the status of several signals throughout the UPS circuit 20 as the circuit 20 changes from line/charger mode to inverter mode and from inverter mode back to line/charger mode.

At time $t_1$, the line voltage fails or goes out of the predetermined limits. The charger ON signal immediately goes low and the disconnect relay 54 is deenergized to disconnect the utility line from the input windings 60. A short delay time thereafter, the inverter is switched ON. In the exemplary UPS circuit 20, this delay is set at 96 microseconds, but may range from a minimum of 20 microseconds up to approximately 100 microseconds without adversely affecting the components using the AC power signal generated by the UPS circuit 20.

As long as the line failure persists, the UPS circuit 20 is in inverter mode and generates the AC power signal from the DC voltage across the battery 48.

At a point indicated by reference character $t_2$, the line voltage is restored. The UPS circuit 20 remains in inverter mode for five additional seconds to ensure that the restoration of the line voltage is not temporary.

After this five second delay, the microcontroller 58 begins to synchronize the AC power signal with the line frequency to prepare for the changeover from inverter mode to line/charger mode. When these signals are synchronized at time $t_3$, the disconnect relay 54 is energized to connect the line voltage to the input windings 60. Eight milliseconds later, the inverter is turned off and sixteen milliseconds after time $t_3$, the charger ON signal goes high to allow the line voltage to charge the battery 48.

FIG. 7 depicts certain voltage waveforms in the UPS circuit 20 when the circuit 20 is in inverter mode, with the inverter power signal being shown at the bottom of this drawing. The generation of a inverter power signal such as that shown in FIG. 7 is fairly conventional and will not be discussed herein in detail.

Figure 8:
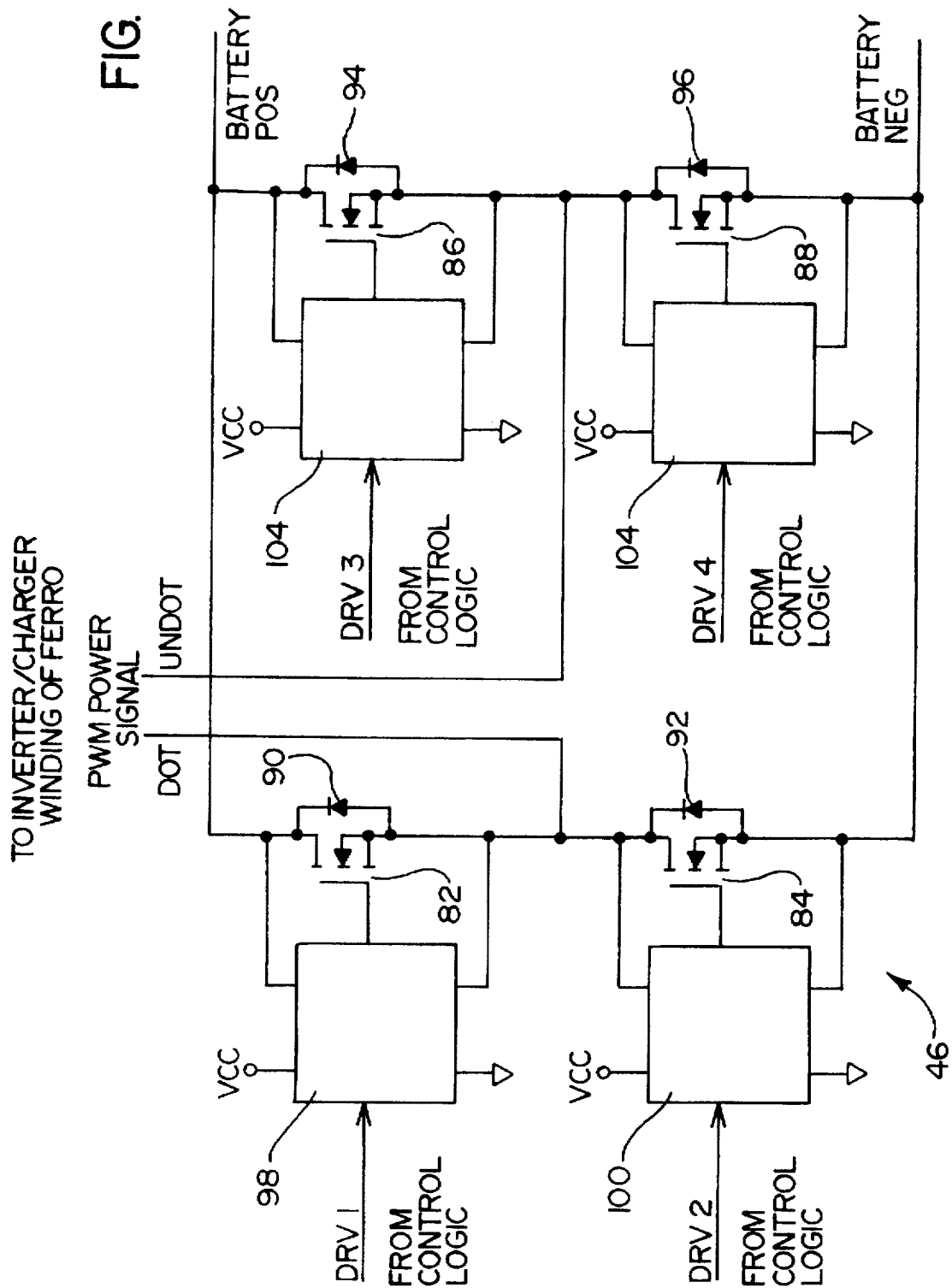
FIG. 8 is a circuit diagram showing details of the switch array depicted in FIGS. 2 and 4.

Referring now to FIG. 8, depicted therein in further detail is the switch circuit 46 described briefly above. The switch circuit 46 basically comprises four power MOSFETs 82, 84, 86, and 88 with integral diodes 90, 92, 94, and 96. FET drive circuits 98, 100, 102, and 104 are associated with the MOSFETs 82, 84, 86, and 88, respectively. Comparing FIGS. 7 and 8, it can be seen that the drive control signals DRV1, DRV2, DRV3, and DRV4 are sent to the driver circuits 98, 100, 102, and 104. The waveforms shown in FIG. 7 develop the inverter power signal waveform also shown in FIG. 7 at the terminals DOT and UN DOT shown in FIG. 8. These terminals are in turn electrically connected to the terminals 62a and 62b of the inverter/charger windings 62.

Figure 9:
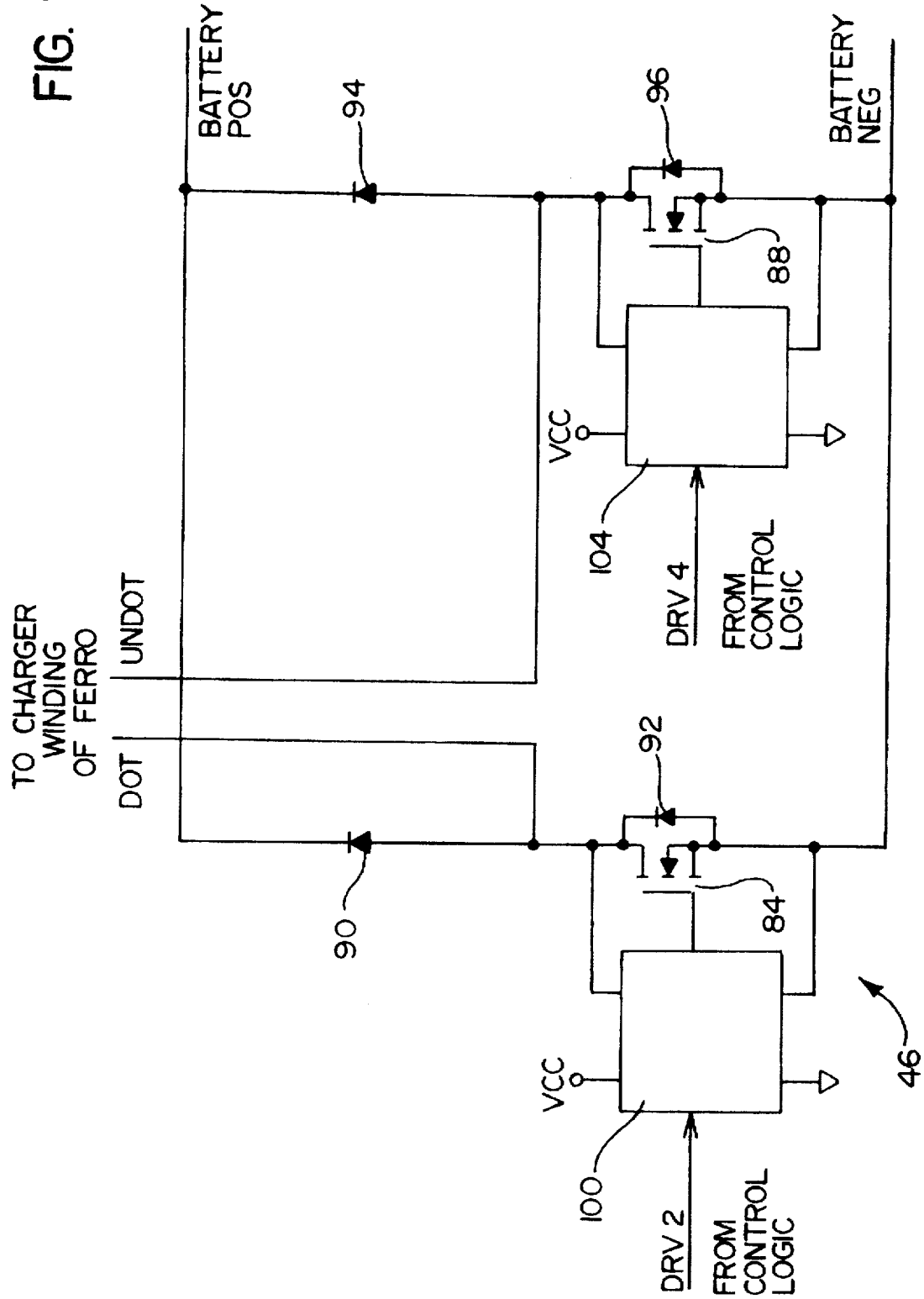
FIG. 9 depicts the switch circuit of the effective circuit shown in FIG. 3.

Referring now to FIG. 9, the switch circuit 46 is shown therein in line/charger mode. The effective circuit shown in FIG. 9 results in the drive signals DRV1 and DRV3 turning off the switches 82 and 86 shown in FIG. 8. The drive control signals DRV2 and DRV4 are turned on and off simultaneously at 50 kH. The pulse width of these signals DRV2 and DRV4 are modulated under the control of the charger drive circuit 40 to develop a signal across the battery terminals that is within the specifications for the particular battery being charged in a given set of environmental conditions. As will be described in further detail below, this arrangement allows the battery to be charged with integral power factor correction.

Referring now to FIG. 10, depicted at 106 therein is an exemplary switch circuit comprising the switch drive circuit 100, switch element 84, and diode 92 shown and described above. This circuit 106 is the same as those associated with the switch elements 82, 86 and 88 described above. Accordingly, only the switch circuit 106 will be described herein in detail.

As shown in FIG. 10, the switch drive circuit 100 basically comprises an input/isolation portion 108, a current limiting portion 110, and a drive portion 112.

The drive signal DRV2 that controls the switch element 84 is applied across a level shifting circuit formed by resistors 114 and 116. An isolating element 118 and its associated capacitors 120, 122, 124, 126 and diodes 128 and 130 isolate the control logic circuit 44 from the high voltages applied across the switching elements 84.

The current limiting circuit 110 comprises capacitors 132 and 134, resistors 136, 138, 140, and 142, diodes 144 and 146 and a FET switch 148. The current limiting circuit 110 is basically conventional and is designed to turn off the switching elements 84 when the current therethrough exceeds a predetermined amount.

The switch drive portion 112 comprises resistors 150 and 152 and diodes 154 and 156 to provide smooth turn on and fast turn off of the switch elements 84. A resistor 158 and Zener diode 160 limit the voltage applied across the switch elements 84. A resistor 162 is provided to buffer the signal applied to the switch elements 84.

At this point, it should be noted that the switch element 84 comprises two MOSFETS with integral rectifying diodes 92 in parallel, although one or more such MOSFETS may be used under different circumstances. It is also not necessary that the MOSFETS and diodes be integrally packaged.

Finally, a snubber circuit is formed by a capacitor 164 and resistor 166.

Figure 11:
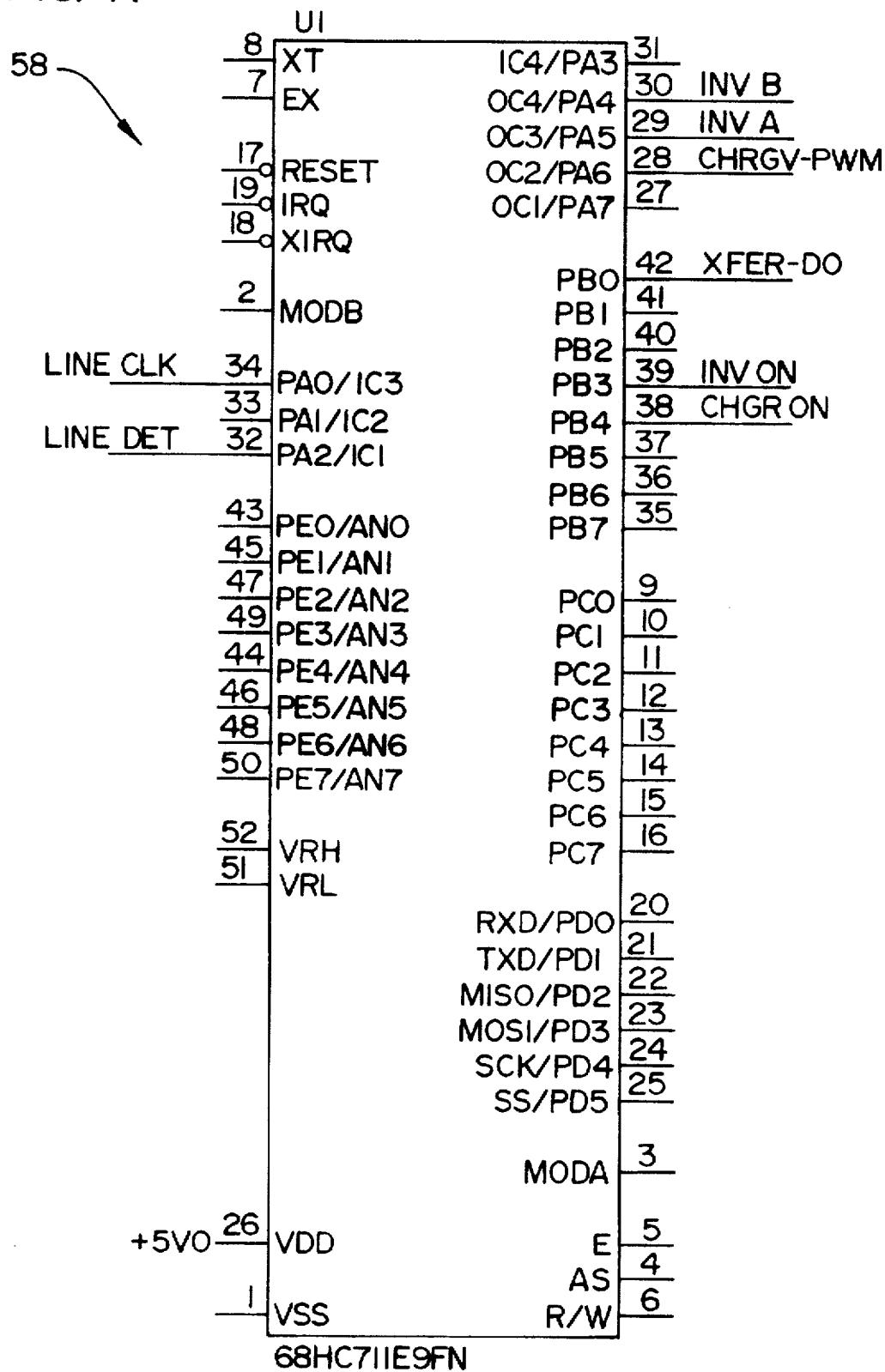
FIG. 11 depicts an exemplary microcontroller that can be used to implement the inverter control circuit portion of the UPS circuit depicted in FIG. 2.

Turning now to FIG. 11, the microcontroller 58 is shown in further detail. The microcontroller 58 is a conventional integrated circuit chip and comprises a microprocessor, random access memory (RAM) and read only memory (ROM). In the exemplary UPS circuit 20, a chip sold by Motorola under Part No. 68HC711E9FN is used. The operation of the software contained within this chip is described above with reference to FIGS. 6 and 7 and will not be described again in further detail.

Figure 12:
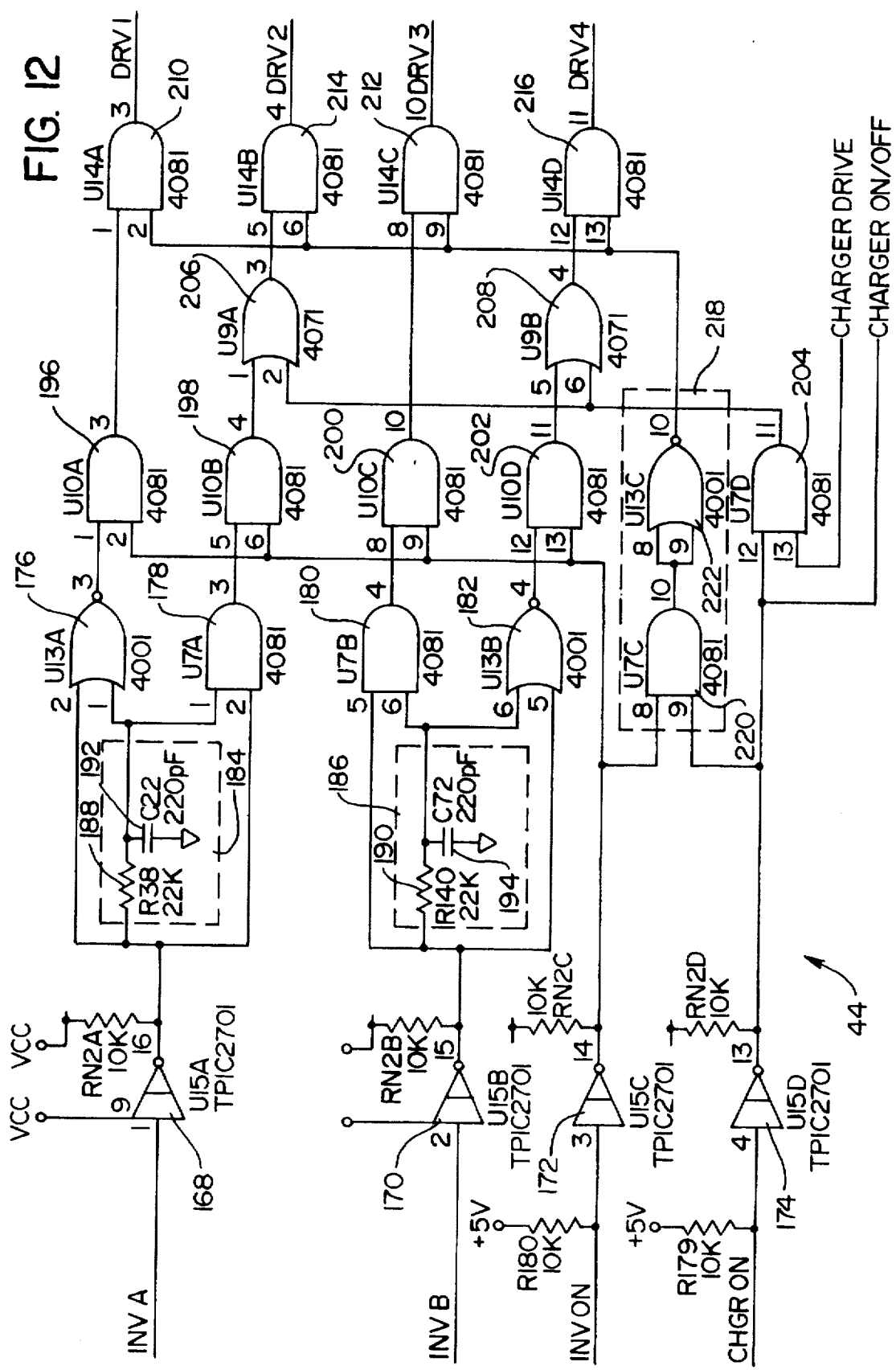
FIG. 12 is a schematic circuit depicting the details of construction of the control logic circuit shown in FIG. 2.

FIG. 12 shows the details of construction of the control logic circuit 44 described above.

The INV A, INV B, INV ON, and CHGR ON signals described above are received by inverters 168, 170, 172, and 174, respectively. These inverters 168-174 ensure that the micro signals are shifted to the appropriate level to drive the logic elements remaining in the control logic circuit 44.

The INV A and INV B signals are initially passed through a NOR gate 176 and AND gate 178 (INV A) and AND gate 180 and NOR gate 182 (INV B). In conjunction with RC circuits 184 and 186, these gates 176-182 develop the DRV1, DRV2, DRV3, and DRV4 signals described above. The delay provided by the RC circuits 184 and 186 cause the DRV1-DRV4 signals to have leading and trailing edges that prevent shoot-through of the switching elements controlled thereby. The values of resistors 188 and 190 and capacitors 192 and 194 are selected to provide approximately 1.5 microsecond of delay, although the specific delay is not crucial.

The outputs of the components 176–182 are directed to AND gates 196–202. The INV ON signal is applied to the other input of these AND gates 196–202 such that the outputs of the components 176–182 are passed by the AND gates 196–202 only when the INV ON signals is high.

Referring now for a moment to the bottom of FIG. 12, it can be seen that the CHGR ON signal is applied to one input of an AND gate 204 and, as will be discussed below, applied to the charger drive circuit 40. The other input of the AND gate 204 is the CHARGER DRIVE signal generated by the charger drive circuit 40. The CHARGER DRIVE signal is thus passed by the AND gate 204 only when the CHGR ON signal is high.

The output of the AND gate 204, along with the outputs of the AND gates 198 and 202, are applied to OR gates 206 and 208. The outputs of the AND gates 196 and 200 described above are further applied to AND gates 210 and 212, while the outputs of the OR gates 206 and 208 are applied to AND gates 214 and 216.

The other inputs of these AND gates 210–216 is generated by a lock-out circuit 218. This lock-out circuit 218 comprises an AND gate 220 and a NOR gate 222 that result in a low signal whenever both the INV ON and CHGR ON signals are high at the same time. The lock-out circuit 218 and AND gates 210–216 thus prevent the uncertain state that would result at the outputs of the OR GATES 206 and 208 from being transmitted to the switch elements controlled thereby.

Accordingly, when the UPS circuit 20 is in the inverter mode, the outputs of the NOR gate 176, AND gate 178, AND gate 180, and NOR gate 182 are present as the drive signals DRV1, DRV2, DRV3, and DRV4 at the AND gates 210, 214, 212, and 216. When the UPS circuit 20 is in charge/line mode, the charger drive signal at the input of AND gate 204 becomes the drive signal DRV2 and DRV4 at the outputs of the AND gates 214 and 216; in this case, the DRV1 and DRV3 signals are held low.

Figure 13A:
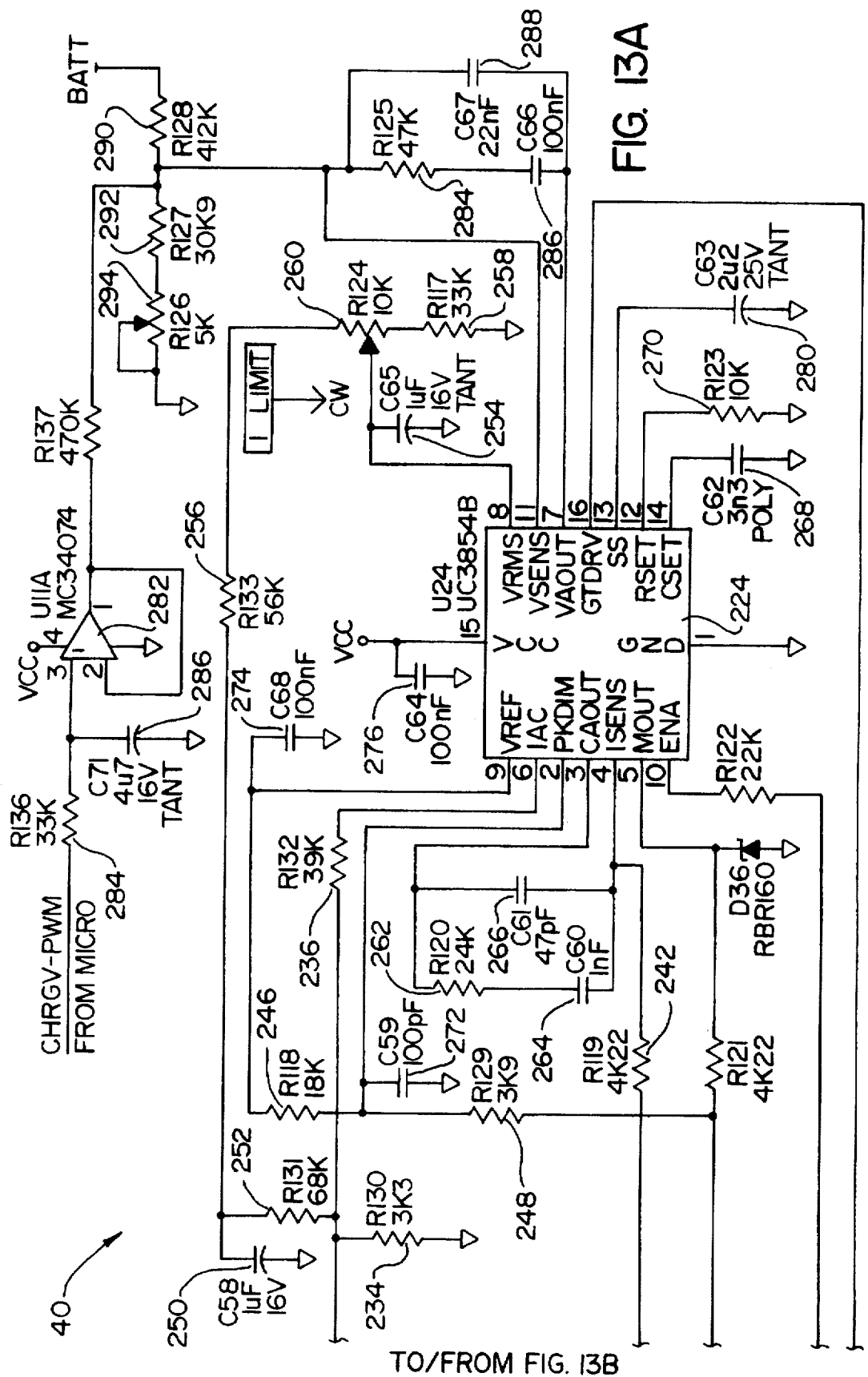
FIG. 13 is a schematic diagram depicting the details of construction of the charger control circuit shown in FIG. 2.

Referring now to FIG. 13, the charger drive circuit 40 will now be described in further detail. At the heart of this circuit 40 is an integrated circuit chip 224 specifically designed to generate a PWM signal for charging a battery with power factor correction. In this case, the PWM signal is generated at pin 16 of the chip 224 and is referred to herein as the CHARGER OUTPUT signal. The CHARGER ENABLE signal described above is applied to pin 10 of the chip 224.

Basically, the chip 224 samples the line voltage and current and generates the power factor corrected charger output signal based on the sampled line voltage and current.

In particular, the line voltage is applied to coupling capacitors 226 and 228 and full wave rectified by an element 230. Resistors 232 and 234 maintain symmetry of the full wave rectified signal. This signal is then applied to pin 6 of the chip 224 through a resistor 236.

The current through the charger winding is rectified by a diode bridge 238 to obtain a voltage signal across a resistor 240 corresponding to the charger winding current. This voltage is then applied to terminal 4 of the chip 224 through a resistor 242.

Resistors 246 and 248 set a voltage limit, while capacitors 250 and 254, resistors 252, 256, 258, and variable resistor 260 establish a current limit. A resistor 262 and capacitors 264 and 266 provide compensation for the operational amplifier within the chip 224.

A capacitor 268 and resistor 270 set the frequency of the PWM signal. Capacitors 272, 274, 276, and 280 are filters.

What is claimed is:

1. A power supply for generating an uninterruptible AC power signal, comprising:

a ferroresonant transformer having first and second primary windings and a secondary winding;

a rechargeable power source;

input means for directly connecting the first primary windings to a utility power source;

fault detect means for generating an inverter-on signal when the utility power supply is not operating within predetermined parameters;

output means for directly connecting the secondary windings to a load;

an H-bridge circuit comprising first, second, third, and fourth switch circuits connected in an H-bridge configuration, the H-bridge circuit being connected between the second primary windings and the rechargeable power source;

charge control means for generating a charge control signal for operating at least some of the switch circuits of the H-bridge circuit to generate a charge power signal for charging the rechargeable power source, the charge control means further comprising power factor correcting means for generating the charge control signal such that the charge power signal is power factor corrected;

inverter control means for generating an inverter control signal for operating at least some of the switch circuits of the H-bridge circuit to generate an inverter power signal across the second primary windings from the rechargeable power source;

logic means for connecting
 the charge control means to the H-bridge circuit such that at least some of the switch circuits are operated based on the charge control signal when the inverter-on signal is not present, and
 the inverter control means to the H-bridge circuit such that at least some of the switch circuits are operated based on the inverter control signal when the inverter-on signal is present.

2. A power supply as recited in claim 1, in which the logic means generates first, second, third, and fourth drive signals for driving the first, second, third, and fourth switch circuits, respectively, based on the charge control, inverter control, and inverter-on signals.

3. A power supply as recited in claim 2, in which the logic means generates the first and third drive signals based on the inverter-on signal and the second and fourth drive signals based on the charge control signal when the inverter-on signal is not present.

4. A power supply as recited in claim 3, in which the first and third drive signals place the first and third switch circuits in an open mode as long as the inverter-on signal is not present.

5. A power supply as recited in claim 2, in which:

the inverter control means generates first and second inverter control signals; and when the inverter-on signal is present, the logic means generates
 the first and third drive signals based on the first inverter control signal, and
 the second and fourth drive signals based on the second inverter control signal.

6. A power supply as recited in claim 3, in which:
   the inverter control means generates first and second inverter control signals; and
   when the inverter-on signal is present, the logic means generates
      the first and third drive signals based on the first inverter control signal, and
      the second and fourth drive signals based on the second inverter control signal.

7. A power supply as recited in claim 1, in which the power factor correcting means generates the charge control signal based on at least one of a line voltage and a line current of the utility power source.

8. A power supply as recited in claim 7, in which the power factor correcting further generates the charge control signal based on a reference signal that may be adjusted depending upon the specifics of the rechargeable power source.

9. A power supply as recited in claim 8, in which the charge control signal is a pulse-width modulated signal.

10. A power supply as recited in claim 1, in which the first and second primary windings are formed on separate bobbins.

11. A power supply as recited in claim 10, in which the bobbins on which the first and second windings are formed are arranged on a magnetic core and separated from each other by a distance predetermined to obtain a desired leakage inductance.

12. A power supply as recited in claim 1, in which a ferroresonant capacitor is connected to the secondary windings of the ferroresonant transformer and a shunt is arranged between the primary and secondary windings.

13. A power supply for generating an uninterruptible AC power signal, comprising:
   a ferroresonant transformer having first and second primary windings, a secondary winding, and a shunt arranged between the primary and secondary windings, the first and second primary windings being arranged to allow leakage inductance therebetween;
   a rechargeable power source;
   input means for directly connecting the first primary windings to a utility power source;
   output means for directly connecting the secondary windings to a load;
   an H-bridge circuit comprising first, second, third, and fourth switch circuits connected in an H-bridge configuration, the H-bridge circuit being connected between the second primary windings and the rechargeable power source; and
   control means for generating control signals for operating the switch circuits of the H-bridge circuit to generate a charge power signal for charging the rechargeable power source and, from the rechargeable power source, an inverter power signal across the second primary windings.

14. A power supply as recited in claim 13, in which the first and second primary windings are formed on separate bobbins.

15. A power supply as recited in claim 14, in which the bobbins on which the first and second windings are formed are arranged on a magnetic core and separated from each other by a distance predetermined to obtain a desired leakage inductance.

16. A power supply as recited in claim 13, in which the control means comprises:
   fault detect means for generating an inverter-on signal when the utility power supply is not operating within predetermined parameters;
   charge control means for generating a charge control signal for operating at least some of the switch circuits of the H-bridge circuit to generate the charge power signal;
   inverter control means for generating an inverter control signal for operating at least some of the switch circuits of the H-bridge circuit to generate the inverter power signal; and
   logic means for connecting
      the charge control means to the H-bridge circuit such that at least some of the switch circuits are operated based on the charge control signal when the inverter-on signal is not present, and
      the inverter control means to the H-bridge circuit such that at least some of the switch circuits are operated based on the inverter control signal when the inverter-on signal is present.

17. A power supply as recited in claim 16, in which the logic means generates first, second, third, and fourth drive signals for driving the first, second, third, and fourth switch circuits, respectively, based on the charge control, inverter control, and inverter-on signals.

18. A power supply as recited in claim 17, in which the logic means generates the first and third drive signals based on the inverter-on signal and the second and fourth drive signals based on the charge control signal when the inverter-on signal is not present.

19. A power supply as recited in claim 18, in which the first and third drive signals place the first and third switch circuits in an open mode as long as the inverter-on signal is not present.

20. A power supply as recited in claim 17, in which:
   the inverter control means generates first and second inverter control signals; and
   when the inverter-on signal is present, the logic means generates
      the first and third drive signals based on the first inverter control signal, and
      the second and fourth drive signals based on the second inverter control signal.

21. A power supply as recited in claim 18, in which:
   the inverter control means generates first and second inverter control signals; and
   when the inverter-on signal is present, the logic means generates
      the first and third drive signals based on the first inverter control signal, and
      the second and fourth drive signals based on the second inverter control signal.

22. A power supply as recited in claim 16, in which the charge control means contains power factor correcting means for generating the charge control signal such that the charge power signal is power factor corrected.

23. A power supply as recited in claim 22, in which the power factor correcting means generates the charge control signal based on a line voltage and a line current of the utility power source.

24. A power supply as recited in claim 23, in which the charge control signal is a pulse-width modulated signal.

25. A power supply as recited in claim 16, in which the bobbins on which the first and second windings are formed are arranged on a magnetic core and separated from each other by a distance predetermined to obtain a desired leakage inductance.

26. A power supply as recited in claim 13, in which the transformer is a ferroresonant transformer having a ferroresonant capacitor connected to the secondary windings and a shunt arranged between the primary and secondary windings.

27. A power supply for generating an uninterruptible AC power signal, comprising:

a ferroresonant transformer having first and second primary windings, a secondary winding, and a shunt arranged between the primary and secondary windings;

a ferroresonant capacitor connected to the secondary winding;

a rechargeable power source;

input means for directly connecting the first primary windings to a utility power source;

fault detect means for generating an inverter-on signal when the utility power supply is not operating within predetermined parameters;

output means for directly connecting the secondary windings to a load;

an H-bridge circuit comprising first, second, third, and fourth switch circuits connected in an H-bridge configuration, the H-bridge circuit being connected between the second primary windings and the rechargeable power source;

charge control means for generating a charge control signal for operating at least some of the switch circuits of the H-bridge circuit to generate a charge power signal for charging the rechargeable power source, the charge control means further comprising power factor correcting means for generating the charge control signal such that the charge power signal is power factor corrected;

inverter control means for generating an inverter control signal for operating at least some of the switch circuits of the H-bridge circuit to generate an inverter power signal across the second primary windings from the rechargeable power source;

logic means for connecting the charge control means to the H-bridge circuit such that at least some of the switch circuits are operated based on the charge control signal when the inverter-on signal is not present, and the inverter control means to the H-bridge circuit such that at least some of the switch circuits are operated based on the inverter control signal when the inverter-on signal is present.

28. A power supply as recited in claim 27, in which the first and second primary windings are formed on separate bobbins.

29. A power supply as recited in claim 28, in which the bobbins on which the first and second windings are formed are arranged on a magnetic core and separated from each other by a distance predetermined to obtain a desired leakage inductance.

* * * * *